US012675928B2

(12) United States Patent (10) Patent No.: US 12,675,928 B2
So et al. (45) Date of Patent: Jul. 7, 2026

(54) ELECTRONIC APPARATUS AND CONTROL METHOD THEREFOR

(71) Applicant: SAMSUNG ELECTRONICS CO., LTD., Suwon-si (KR)

(72) Inventors: Yongjin So, Suwon-si (KR); Hyunjee Kwak, Suwon-si (KR); Eunhee Park, Suwon-si (KR); Seungmin Lee, Suwon-si (KR); Eunjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 18/426,635

(22) Filed: Jan. 30, 2024

(65) Prior Publication Data

US 2024/0169627 A1 May 23, 2024

Related U.S. Application Data

(63) Continuation of application No. PCT/KR2022/013932, filed on Sep. 19, 2022.

(30) Foreign Application Priority Data

Sep. 30, 2021 (KR) ........................ 10-2021-0130082

(51) Int. Cl.
 G06T 11/60 (2026.01)
 G06T 5/20 (2006.01)
 (Continued)

(52) U.S. Cl.
 CPC ............... G06T 11/60 (2013.01); G06T 5/20 (2013.01); G06T 7/60 (2013.01); G06T 7/90 (2017.01); *G06T 2207/10024* (2013.01)

(58) Field of Classification Search
 CPC ......... G06T 11/001; G06T 11/60; G06T 5/20; G06T 5/50; G06T 7/60; G06T 7/70;
 (Continued)

(56) References Cited

U.S. PATENT DOCUMENTS 7,046,865 B2    5/2006  Kasutani
7,602,527 B2   10/2009  Yoda et al.
 (Continued)

FOREIGN PATENT DOCUMENTS

JP    2003-141540      5/2003
JP    2006-279929     10/2006
 (Continued)

OTHER PUBLICATIONS

International Search Report dated Jan. 26, 2023 issued in PCT Application No. PCT/KR2022/013932.
 (Continued)

*Primary Examiner* — Wesner Sajous
(74) *Attorney, Agent, or Firm* — STAAS & HALSEY LLP

(57) ABSTRACT

In an electronic apparatus and a control method therefor, the electronic apparatus comprises a memory, a display, and a processor to process at least one image information stored in the memory. The processor can identify the ratio and dominant color of at least one image based on the at least one image information, identify the type of layout based on the number of the at least one image and the identified ratio of the at least one image, arrange the at least one image in the identified type of the layout, identify the color for the layout based on the size of the arranged image and the identified dominant color, and display, on the display, the layout in which the identified color is arranged and the at least one image is arranged.

18 Claims, 16 Drawing Sheets

(51) Int. Cl.
| | |
|---|---|
| *G06T 7/60* | (2017.01) |
| *G06T 7/90* | (2017.01) |
| *G09G 5/02* | (2006.01) |
| *G09G 5/06* | (2006.01) |
| *G09G 5/39* | (2006.01) |
| *H04N 21/431* | (2011.01) |

(58) Field of Classification Search
CPC ............. G06T 7/90; G06T 2207/10024; G06T 2207/10016; G06T 2200/24; G06T 3/4038; G06T 7/0002; G06T 3/04; G06T 3/0407; G06T 2207/20221; G06F 18/22; G06F 3/048; G06F 3/04841–04847; G06F 3/04817; G06F 16/51; G06F 16/583; G06F 16/538; G06F 16/9535; G06F 9/451; G06F 8/38; G06F 3/14; G06F 40/106; G06F 13/00; G06F 16/54; G09G 5/02; G09G 5/06; G09G 5/10; G09G 5/14; G09G 5/32; G09G 2320/028; G09G 2320/06; G09G 2320/0666; G09G 2340/14; G11B 27/28; G06V 20/46; G06V 10/75; H04N 1/00127; H04N 21/431; H04N 21/47; H04N 21/4316; H04N 21/4821; H04N 21/42208; H04N 9/00; H04N 7/147; H04N 7/152; H04N 7/012; G06Q 50/01; G06Q 20/202; G06Q 20/209; G06Q 30/0641; G06Q 30/0277; G06Q 30/0247; G06Q 30/02; G06Q 20/20; G06H 30/20
See application file for complete search history.

(56) References Cited

U.S. PATENT DOCUMENTS

| | | | |
|---|---|---|---|
| 7,864,978 B2 | 1/2011 | Anthony et al. | |
| 7,991,232 B2 | 8/2011 | Iwamoto | |
| 8,516,365 B2 | 8/2013 | Hoyer et al. | |
| 9,397,844 B2 * | 7/2016 | Howard | G09G 5/026 |
| 10,567,598 B2 | 2/2020 | Saito | |
| 10,805,606 B2 | 10/2020 | Ma et al. | |
| 10,853,976 B2 * | 12/2020 | Lee | G06T 11/001 |
| 10,964,069 B2 * | 3/2021 | Vadhri Venkata | G06F 8/38 |
| 11,113,850 B2 | 9/2021 | Kim et al. | |
| 11,829,437 B2 | 11/2023 | Goldstein et al. | |
| 2006/0197985 A1 * | 9/2006 | Yoda | H04N 1/00127 358/1.18 |
| 2009/0015593 A1 | 1/2009 | Kang et al. | |
| 2012/0313962 A1 * | 12/2012 | Hsu | G06F 3/04817 345/593 |
| 2018/0189983 A1 * | 7/2018 | Lee | H04N 9/00 |
| 2020/0344517 A1 | 10/2020 | Park et al. | |
| 2021/0027354 A1 | 1/2021 | Stein et al. | |
| 2021/0073943 A1 * | 3/2021 | Park | G06T 3/4038 |

FOREIGN PATENT DOCUMENTS

| | | | | |
|---|---|---|---|---|
| JP | 2014-99876 | 5/2014 | | |
| JP | 2019-8456 | 1/2019 | | |
| JP | 2019-208088 | 12/2019 | | |
| KR | 10-0750424 | 8/2007 | | |
| KR | 10-2009-0005621 | 1/2009 | | |
| KR | 10-2013-0058476 | 6/2013 | | |
| KR | 20130058476 A * | 6/2013 | | G06F 3/14 |
| KR | 10-2014-0037440 | 3/2014 | | |
| KR | 10-2015-0070607 | 6/2015 | | |
| KR | 10-1546732 | 8/2015 | | |
| KR | 10-2016-0055262 | 5/2016 | | |
| KR | 10-2019-0020083 | 2/2019 | | |
| KR | 10-2019-0089637 | 7/2019 | | |
| KR | 10-2020-0035556 | 4/2020 | | |

OTHER PUBLICATIONS

Written Opinion Report dated Jan. 26, 2023 issued in PCT Application No. PCT/KR2022/013932.
Korean Office Action dated Jan. 9, 2026 for Korean Application No. 10-2021-0130082.

* cited by examiner

201

202

<u>204</u>

205

<u>207</u>

(a)

(b)

ELECTRONIC APPARATUS AND CONTROL METHOD THEREFOR

CROSS-REFERENCE TO RELATED APPLICATIONS

This application is a continuation application, filed under 35 U.S.C. § 111(a), of International Application PCT/KR2022/013932 filed Sep. 19, 2022, and is based on and claims priority under 35 U.S.C. § 119 to Korean Patent Applications No. 10-2021-0130082, filed on Sep. 30, 2021 in the Korean Intellectual Property Office, the disclosures of which are incorporated by reference herein in their entireties.

TECHNICAL FIELD

The disclosure relates to an electronic apparatus and method for controlling the same, and more particularly, to an electronic apparatus capable of displaying images and method for controlling the same.

BACKGROUND ART

With the recent advancement of electronic technologies, electronic apparatuses for providing various user experiences are being developed. Especially, development of a display apparatus that is able to display a picture selected by the user in a standby mode is underway these days.

However, it is common for such picture display apparatuses to have nothing to do with a layout including color, patterns, etc., around the picture. In this case, the layout except for a region where the picture is placed is visually separated from the picture and gives the user a feeling of difference.

In addition, a traditional picture layout display technology has a function of automatically placing all images selected by the user in the layout but has increasing complexity with an increasing number of selected images.

DISCLOSURE

Technical Problem

The disclosure provides an electronic apparatus capable of displaying images and method for controlling the same.

The disclosure also provides an electronic apparatus and method for controlling the same, which identifies a type of a layout based on the number and ratios of images selected by the user and arranges and displays the images in the identified type of layout.

The disclosure also provides an electronic apparatus and method for controlling the same, which identifies and displays a color for the layout based on a dominant color of the image selected by the user.

Technical Solution

According to an aspect of the disclosure, an electronic apparatus includes a memory to store a plurality of images, a display, and a processor configured to process at least one image information of at least one image of the plurality of images stored in the memory, wherein the processor is configured to identify a ratio and a dominant color of the at least one image based on the at least processed image information, identify a type of a layout of the at least one image based on a number of the at least one image and the identified ratio of the at least one image, arrange the at least one image in the identified type of the layout, identify a color for the layout based on a size of the at least one arranged image and the identified dominant color, and display the layout in which the identified color is arranged and the at least one image is placed on the display.

The processor may give a weight according to the size of the at least one image, identify a main dominant color based on the weight given to the at least one image and the identified dominant color, and identify a color for the layout further based on the identified main dominant color.

The memory may further store a color chip list corresponding to a color value of the dominant color, and the processor may identify a color for the layout based on the identified dominant color and the color chip list.

The electronic apparatus may further include a speaker, and the processor may identify a time, a place and a weather condition in which the at least one image is captured based on the at least one processed image information, identify a sound based on at least one of the identified time, place and weather condition, and control the speaker to output the identified sound.

The processor may identify a common object in at least two images based on at least two pieces of processed image information, and correct a region of an image displayed on the display based on the identified object.

The electronic apparatus may further include a communicator to receive configuration information including a filter type, and the processor may display the at least one image on the display by applying a filter to the at least one image based on the configuration information.

The layout may include an image region and an information region, and the processor may display at least one of a weather condition, a date and a time in the information region.

The processor may identify a type of the at least one image based on the at least one processed image information, and display the at least one image on the display by differently applying a filter to the at least one image based on the identified type of the at least one image.

The processor may identify a type of the at least one image based on processing of the at least one processed image information, and group the at least one image based on the identified type of the at least one image, and identify and display a type of the layout, arrangement of the at least one image and color for the layout on the display based on the grouped image.

The processor may switch between groups of the grouped images at predetermined intervals.

The processor may identify a type of the at least one image based on processing of the at least one processed image information, and identify an image selection pattern based on the identified type of the at least one image, group the at least one image based on the identified image selection pattern, and identify and display a type of the layout, arrangement of the at least one image and color for the layout on the display based on the grouped image.

According to an aspect of the disclosure, a method of controlling an electronic apparatus comprising a memory, a processor and a display, includes storing at least one image information in the memory, identifying, by the processor, a ratio and a dominant color of at least one image based on the at least one stored image information, identifying a type of a layout of the at least one image based on a number of the at least one image and the identified ratio of the at least one image and arrange the at least one image in the identified type of the layout, identifying a color for the layout based on a size of the at least one arranged image and the identified dominant color, and displaying the layout in which the identified color is arranged and the at least one image is placed.

The identifying of the ratio and the dominant color of the image comprises giving a weight depending on the size of the at least one image and identifying a main dominant color based on the weight given to the at least one image and the identified dominant color, and the identifying of the color comprises identifying a color for the layout further based on the identified main dominant color.

The storing comprises storing a color chip list corresponding to a color value of the dominant color, and the identifying of the color comprises identifying a color for the layout based on the identified dominant color and the color chip list.

The identifying of the ratio and the dominant color of the at least one image comprises identifying a time, a place and a weather condition in which the at least one image is captured based on the at least one image information, and wherein the displaying comprises identifying a sound based on at least one of the identified time, place and weather condition, and outputting the identified sound.

Advantageous Effects

According to the disclosure, an electronic apparatus capable of displaying images and method for controlling the same may be provided.

According to the disclosure, an electronic apparatus and method for controlling the same, which identifies a type of a layout based on the number and ratios of images selected by the user and places and displays the images in the identified type of layout, may be provided.

According to the disclosure, an electronic apparatus and method for controlling the same, which identifies and displays color for the layout based on a dominant color of the image selected by the user, may be provided.

MODES OF THE INVENTION

Figure 1:
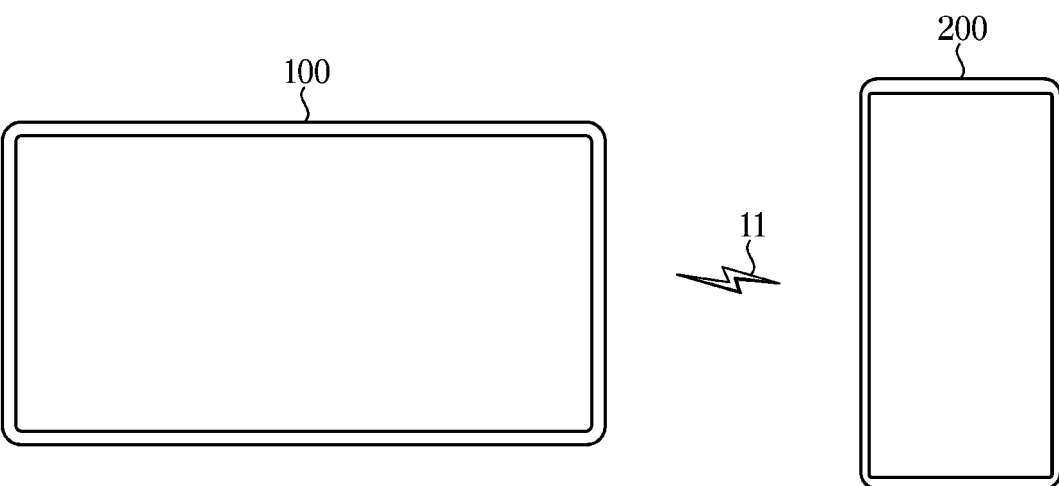
FIG. 1 is a conceptual diagram for describing an electronic system, according to an embodiment of the disclosure.

Throughout the specification, like reference numerals refer to like components or components for performing substantially the same functions. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

An electronic apparatus and/or method for controlling the same will now be described with reference to accompanying drawings.

FIG. 1 is a conceptual diagram for describing an electronic system, according to an embodiment of the disclosure.

Referring to FIG. 1, an electronic system 10 according to an embodiment of the disclosure may include an electronic apparatus 100 and/or a user equipment (UE) 200.

The electronic apparatus 100 and the UE 200 may be connected to each other over a network 11. The network 11 refers to a wired or wireless connection structure allowing information exchange between respective nodes such as a UE and/or a server, and as examples of the network 11, includes 3rd generation partnership project (3GPP) network, a long term evolution (LTE) network, a 5th generation (5G) network, a world interoperability for microwave access (WiMAX) network, Internet, a local area network (LAN), a wireless LAN (WLAN), a wide area network (WAN), a personal area network (PAN), an ultra wide band (UWB) network, a bluetooth network, bluetooth low energy (BLE), near field communication (NFC), a satellite broadcasting network, an analog broadcasting network, a digital multimedia broadcasting (DMB) network, etc., without being limited thereto.

The electronic apparatus 100 may display an image provided by an owner, an administrator or a user (hereinafter, referred to as the user) of the electronic apparatus 100.

For this, the UE 200 transmits an image to be displayed by the user on the electronic apparatus 100, so that the electronic apparatus 100 may display the image received from the UE 200. The image to be displayed by the electronic apparatus 100 may be e.g., an image selected by the user and received from the UE 200, or an image stored in an internal memory of the electronic apparatus 100 and selected by the user through an input means. However, it is not limited thereto.

Specifically, the electronic apparatus 100 may determine a type of a layout based on an image received from the UE 200 and/or an image selected by the user from among the images stored in the memory of the electronic apparatus 100, and arrange and display the image in the determined type of the layout. Furthermore, the electronic apparatus 100 may store image information received from the UE 200 in the memory, determine a type of the layout based on processing of the image information stored in the memory, and display the layout by arranging the image in the determined type of the layout.

Moreover, the electronic apparatus 100 may determine a color for the layout based on the selected (received) image, and display the layout that reflects the determined color and the image arranged in the layout.

The layout may be e.g., a digital frame having such a form as a frame within which an image is arranged. Specifically, the layout may include e.g., an image region to display an image selected by the user and/or an information region to display various information. The various information may be, for example, a time, a weather condition, information received from external electronic apparatuses, but is not limited thereto.

The UE 200 may include, for example, any type of input/output enabled wired or wireless communication devices such as a personal communication system (PCS), a global system for mobile communication (GSM), personal digital cellular (PDC), a personal handyphone system (PHS), a personal digital assistant (PDA), international mobile telecommunication (IMT)-2000, code division multiple access (CDMA)-2000, W-CDMA, a wireless broadband Internet (Wibro) terminal, a smartphone, a smart pad, a tablet PC, a laptop, a wearable device, a digital signage, etc., without being limited thereto.

The electronic apparatus 100 may be a smart TV as shown in FIG. 1. It is, however, merely an example, and the electronic apparatus 100 may be implemented as an electronic device equipped with a display such as a digital TV, a desktop PC, a kiosk, etc. Furthermore, for example, the electronic apparatus 100 may be implemented as the UE 200 as well. Although for convenience of explanation, the electronic apparatus 100 and the UE 200 will now be described as separated ones, descriptions about the electronic apparatus 100 may be equally applied to the UE 200 as well.

In the meantime, the electronic apparatus 100 and/or the UE 200 are described as performing direct communication, but are not limited thereto.

Specifically, the electronic apparatus 100 may communicate with the UE 200 via an external device and/or a server (not shown). The external device (not shown) may be a set-top box as well as various repeaters such as an AP, a router, etc., that relay communications between the electronic apparatus 100 and/or the UE 200.

Figure 2:
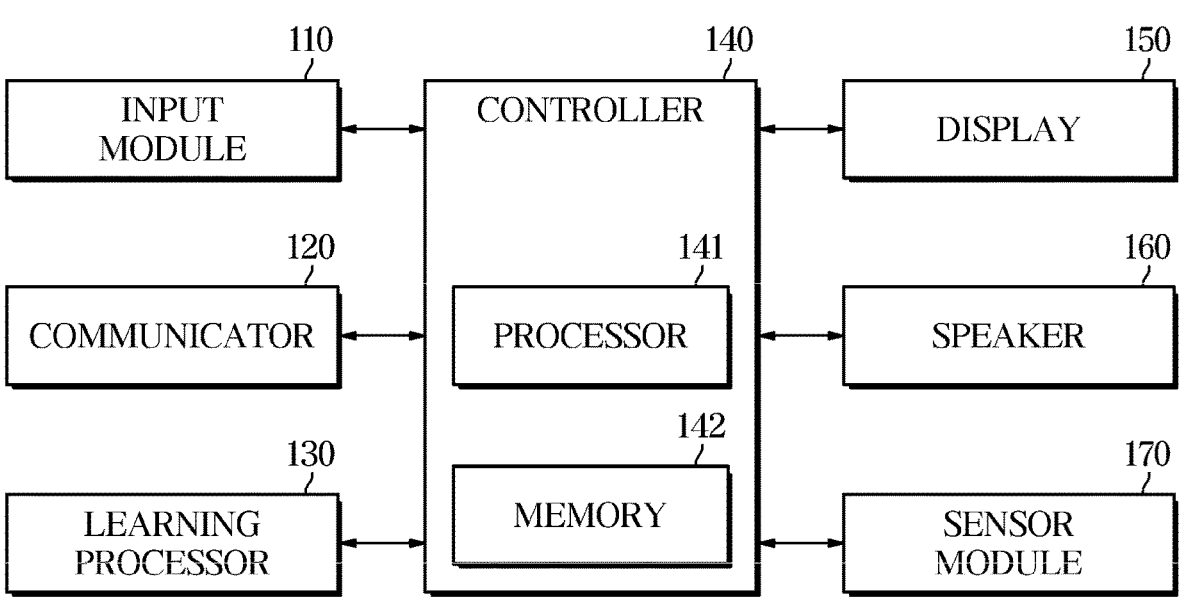
FIG. 2 is a block diagram illustrating a configuration of an electronic apparatus, according to an embodiment of the disclosure.

FIG. 2 is a block diagram illustrating a configuration of the electronic apparatus 100, according to an embodiment of the disclosure.

Referring to FIG. 2, the electronic apparatus 100 according to an embodiment of the disclosure may include an input module 110, a communicator 120, a display 130, a controller 140, a speaker 150 and/or a sensor module 160.

The input module 110 may be implemented in a hard key type, or in a case that the display 130 is implemented in a touch screen type, the input module 110 may be arranged on the front of the display 130 in a touch panel form.

The input module 110 may receive image selection information and/or configuration information from the user.

The user may select an image to be displayed on the display 130 through the input module 110 and input the selected image. Specifically, through the input module 110, the user may select an image to be displayed through the display 130 from among a plurality of images stored in the memory. In this case, the user may select at least one image to be displayed or may select a plurality of images. Accordingly, the input module 110 may input the selected at least one image.

Furthermore, the user may input the configuration information through the input module 110. The configuration information may include, for example, a kind of a filter to be applied to an image to be displayed through the display 130 and/or an image conversion rate and/or information (weather, date, clock, etc.) to be displayed along with the image and/or filter type information. However, it is not limited thereto. In another embodiment, the configuration information may include information about a type of grouped images to be displayed.

To receive an input of the image selection information and/or the configuration information from the user, the input module 110 may include a software device such as a graphical user interface (GUI). In this case, the GUI may be implemented in a touch pad, for example. The touch pad may be implemented as a touch screen panel (TSP).

In addition, the input module 110 may include a hardware device for user input, such as many different buttons or switches, a pedal, a keyboard, a mouse, a track ball, various levers, a handle, a stick, or the like. However, it is not limited thereto.

The communicator 120 may transmit or receive various data by communicating with the UE 200 and/or an external device and/or an external server (hereinafter, the UE 200 or the like).

Specifically, the communicator 120 may receive an image selected by the user and/or the configuration information from the UE 200 or the like. In other words, the electronic apparatus 100 may not only obtain an image selected by the user or the configuration information through the input module 110 but also receive the image or the configuration information through the communicator 120.

For this, the communicator 120 may include one or more components that enable communication with the external device, for example, at least one of a short-range communication module, a wired communication module and/or a wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, an NFC module, a Zigbee communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (Wibro) module, and/or any wireless communication device for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may include a wireless communication interface including an antenna and/or transmitter for transmitting data. Furthermore, the wireless communication module may further include a signal conversion module for modulating a digital control signal output from the controller 140 through the wireless communication interface to an analog wireless signal under the control of the controller 140.

The wireless communication module may further include a signal conversion module for demodulating an analog radio signal received through the wireless communication interface into a digital control signal.

The display 130 may be controlled based on a control signal of the controller 140.

For this, the display 130 may employ one of various types of display panels such as a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (QLED) panel, a quantum dot LED (QLED) panel, etc., but is not limited thereto.

The controller 140 may be implemented with a memory 142 for storing an algorithm to control operation of the components of the electronic apparatus 100 or data about a program that embodies the algorithm, and a processor 141 for carrying out the aforementioned operation using the data stored in the memory. In this case, the memory 142 and the processor 141 may be implemented in separate chips. Alternatively, the memory 142 and the processor 141 may be implemented in a single chip.

The processor 141 may control general operation of the electronic apparatus 100.

The processor 141 may process image information of an image selected by the user through the input module 110 and/or the communicator 120. The image information may include not only an image including a hue, saturation and/or brightness at each coordinates but also at least one of, for example, a time and a place at which the image is captured and/or weather information during the capturing. However, it is not limited thereto. In another embodiment, the image information may be metadata about information relating to a plurality of images and each of the images, and one-image information may be about one image and information data relating to the one image.

The processor 141 will now be described in detail, and specifically, the processor 141 may identify a ratio and/or a dominant color of a selected image based on processing of the image information. The dominant color may refer to, for example, a color that occupies the largest portion of the image. However, it is not limited thereto. In another embodiment, the dominant color may refer to an average color of the image.

The processor 141 may identify a type of the layout based on the number of input or received images and/or a ratio of the identified image, and place the image in the type of the layout. In this case, the processor 141 may change the size, ratio and/or a region of the image for display while arranging the selected image in the identified type of the layout. In other words, the processor 141 may set up an area where the image in the layout is reflected in the image region and displayed on the display 130. Specifically, the processor 141 may cut (correct) the image so that a portion of the image is displayed.

Furthermore, the processor 141 may identify at least one of A type and/or B type layout according to the number of selected images, and identify at least one of first to third types of layouts included in the A type and/or fourth to seventh types of layouts included in the B type based on a ratio of each selected image. The processor 141 may also identify a vertical type layout further based on tilt information of the electronic apparatus 100 received from the sensor module 160.

Furthermore, the processor 141 may identify a color for the layout based on the number and sizes of the selected images and/or the dominant color of the identified image, and control the display 130 to display the identified layout. The identifying of the dominant color may be, for example, for minimizing a feeling of difference between the image selected by the user and the layout.

Specifically, the processor 141 may identify an average of color values of the respective pixels included in the image as the dominant color based on processing of the image information when one image is selected. However, it is not limited thereto. In this case, as one image is selected, the identified dominant color may refer to identifying of a main dominant color to be a basis to identify a color for the layout.

In another embodiment, when one image is selected, the processor 141 may identify a color value that occupies the highest portion of the image as the dominant color. However, it is not limited thereto.

The color value is an example, and one of the hue, the saturation and/or the brightness may be identified as the color value, and may be identified based on at least one of the hue, the saturation and/or the brightness.

However, for convenience of explanation, the color value will now be described as the hue.

In another embodiment, the processor 141 may classify a plurality of predetermined ranges of color values with respect to a color value of each pixel of the image based on the processing of the image information in a case that one image is selected, and identify a medium color value in one of the plurality of ranges, which has the most pixels, as the main dominant value. For example, in a case that color values are classified into predetermined ranges of e.g., 0 to 30, 31 to 60 and 61 to 90 and that a largest number of pixels have color values of 31 to 60, an average color value of the pixels having the color values of 31 to 60 may be the main dominant value. However, it is not limited thereto.

Furthermore, when at least two images are selected, the processor 141 may identify one image having a higher value based on at least one of resolution and/or size of each image based on the processing of the image information, and identify the dominant color based on the identified one image. In other words, the processor 141 may identify one of the plurality of images based on at least one criterion, and identify a dominant color based on the identified one image. However, it is not limited thereto.

In another embodiment, when a plurality of images are selected, the processor 141 may identify a dominant color of each image, give weights to the plurality of images based on at least one of the resolution and/or the size, and identify a main dominant color based on the weight and/or the dominant color for each image. For example, the processor 141 may give a weight to a dominant color of each image in proportion to the size of each of the plurality of images, and identify an average of the dominant colors given the weights as a main dominant color.

In the meantime, the processor 141 may identify a time, a place and/or a weather condition in which the image is captured based on the processing of the image information, and control the display 130 to display information relating to the image in an information region included in the layout based on at least one of the identified time, place and/or weather condition in which the image is captured. Specifically, when the place where the image is captured is different from a current place obtained from the sensor module 160, the processor 141 may control the display 130 to display time information of the place where the image is captured in the information region of the layout. Accordingly, the user may obtain the image with vividness of the image.

Furthermore, the processor 141 may identify a sound based on at least one of the time, the place and/or the weather condition in which the image is captured, which are obtained from processing of the image information. In other words, the processor 141 may identify a sound according to a vibe of the image based on the processing of the image information. For example, in a case that the weather condition during the image capturing is rainy, the processor 141 may generate a control signal to control the speaker 150 to output a sound of rain while displaying the image on the display 130.

In the meantime, when there are a multiple pieces of image information selected (received) from the input module 110 and/or the communicator 120, the processor 141 may identify a common object in the multiple pieces of image information based on the processing of the image information.

Specifically, the identifying of the common object in the multiple pieces of image information based on the processing of the image information may be, for example, identifying the common object based on an object identification model that is trained to output only an object trained with the image information as an input through an artificial neural network. It is not, however, limited thereto, and a traditionally known machine learning algorithm including unsupervised learning, reinforcement learning and/or supervised learning or a machine learning algorithm to be developed in the future may be applied thereto.

Hence, the processor 141 may identify a common object in the selected (received) multiple pieces of image information based on the multiple pieces of image information to correct an area for an image to be displayed on the display 130 based on the common object. For example, the processor 141 may arrange the image so that the common object in the multiple pieces of image information comes in the center of an image region of the layout. In another embodiment, the processor 141 may adjust the position of the frame of the layout to enlarge an area for the common object in the multiple pieces of image information. However, it is not limited thereto.

The processor 141 may identify a type of the image based on the processing of the selected (received) image information. The type of the image may include, for example, a person image taken of a person, a landscape image taken of a landscape, an object image taken of a particular object, a pattern image taken of a pattern, an image taken at a particular time, an image taken at a particular place, an image having a similar color value, etc. However, it is not limited thereto.

Specifically, the type of the image may be identified based on, for example, a type identification model trained to identify a type with an input of multiple pieces of image information of the same type through a supervised learning based machine learning algorithm. It is not, however, limited thereto, and a traditionally known machine learning algorithm including unsupervised learning, reinforcement learning and/or supervised learning or a machine learning algorithm to be developed in the future may be applied thereto.

In the meantime, the processor 141 may generate a control signal to apply a filter to the image region of the layout and display the filtered image region on the display 130 based on filter type information included in configuration information obtained through the input module 110 and/or the communicator 120. The filter type information may include, for example, filter information according to a kind of the filter and/or a type of the image. For example, the filter type information may include configuration information to apply a black and white filter when the type of the image is a person. In other words, the processor 141 may identify a type of the image based on the processing of the image information, and differently apply a filter to the image based on the identified type of the image.

The processor 141 may group the multiple pieces of image information based on the type of the image based on the processing of the image information. Accordingly, the processor 141 may switch image information to be displayed on the display 130. In this case, with the switching of the image information, a type and/or a color for the layout and/or arrangement of the image may be changed as described above.

Specifically, when the user does not separately change nor select image information in person, the processor 141 may control the display 130 to switch and display image information from one group to another classified by the type of the image at predetermined intervals to prevent an image from being fixedly displayed.

The processor 141 may identify an image reception (selection) pattern based on the type of image information selected (received) through the input module 110 and/or the communicator 120. The image reception (selection) pattern may refer to, for example, a pattern of an image type selected by the user. Accordingly, the processor 141 may control to group corresponding images based on the identified image reception (selection) pattern and make arrangement in the layout based on the grouped images. This may enable an image that suits the need of the user to be displayed.

The processor 141 may identify a color for the layout based on the dominant color of the identified image and/or the color chip list, based on the processing of the image information.

The memory 142 may store various information relating to the electronic apparatus 100. The memory 142 may store color chip list information corresponding to color values. The color chip list information may refer to, for example, a group list of colors corresponding to color values identified based on the hue, saturation and brightness. In the meantime, the color chip list may be, for example, received or updated from an external server and/or an external electronic device and stored in the memory 142, without being limited thereto.

The memory 142 may store a program and/or data for the processor 141 to process image information, a program and/or data for the processor 141 to generate a control signal for the display 130 and a program and/or data for the processor 141 to generate a control signal for the speaker 150.

Furthermore, the memory 142 may store image information to be used for the processor 141 to process the image information. Specifically, the memory 142 may store image information received wiredly and/or wirelessly from an external device (not shown) and/or a camera (not shown), image information selected and input through the input module 110, and/or image information received through the communicator 120. Accordingly, the processor 141 may process image information based on the image information stored in the memory 142 and/or the image information transmitted and stored.

For this, the memory 142 may be implemented with at least one of a non-volatile memory device, such as cache, read only memory (ROM), programmable ROM (PROM), erasable programmable ROM (EPROM), electrically erasable programmable ROM (EEPROM), and/or a volatile memory device, such as random access memory (RAM), or a storage medium, such as hard disk drive (HDD) or compact disk (CD) ROM, without being limited thereto.

The speaker 150 may provide the user with various information and entertainment through sound. For example, the speaker 150 may output and provide various sounds based on a control signal to output a sound identified by the controller 140.

The sensor module 160 may include, for example, a position detection sensor including a GPS. Specifically, the sensor module 160 may generate location information of the electronic apparatus 100, and further include a tilt sensor, an inertia measurement sensor, etc., that are able to detect a direction, an inclination, etc., of the electronic apparatus 100. Hence, the sensor module 160 may generate tilt information of the electronic apparatus 100.

Embodiments of the disclosure will now be described in detail with reference to FIGS. 3 to 15.

Figure 3:
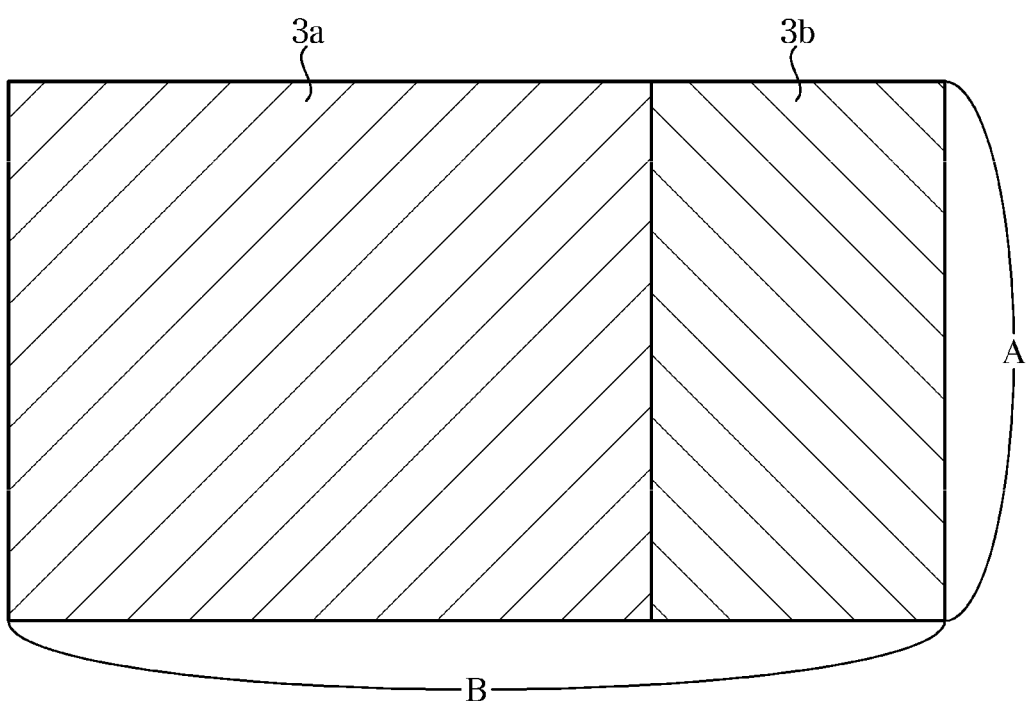
FIG. 3 is a conceptual diagram for describing a ratio and a dominant color of an image identified by a controller, according to an embodiment of the disclosure.

FIG. 3 is a conceptual diagram for describing a ratio and/or a dominant color of an image identified by the controller 140, according to an embodiment of the disclosure.

Referring to FIG. 3, the controller 140 may obtain a ratio of width B and/or height A of an image based on processing of image information. The ratio may be identified as A/B for example, but is not limited thereto.

The controller 140 may identify a shape of the image as being approximate to a square form as the ratio of the image approximates 1. Specifically, the controller 140 may identify the image as a square image when the ratio of the image is 1 or within a predetermined error range of 1. However, it is not limited thereto. Furthermore, the controller 140 may identify the image as a vertical image when the ratio of the image is greater than 1 and out of the predetermined error range. Moreover, the controller 140 may identify the image as a horizontal image when the ratio of the image is smaller than 1 and out of the predetermined error range. Accordingly, the controller 140 may identify a square image, a horizontal image or a vertical image based on the processing of the image information. However, it is not limited thereto.

In the meantime, an image in the predetermined error range of 1 may specifically approximate a square, but corresponds to a horizontal image or a vertical image. Hence, the controller 140 may correct (cut) an area of the image to fit the ratio 1.

In the meantime, as shown in FIG. 3, the image may include a first area 3*a* having a first color and/or a second area 3*b* having a second color. In this case, the controller 140 may identify a color of the first area 3*a* that occupies a wider range as a dominant color. In other words, the controller 140 may identify the dominant color of the first area 3*a* shown in FIG. 3 as a dominant color of the image.

In another embodiment, the controller 140 may give a weight to the first color in proportion to the size of the first area 3*a*, give a weight to the second color in proportion to the size of the second area 3*b*, and identify an average of colors divided by a sum of the respective weights as the dominant color. However, it is not limited thereto.

Accordingly, the controller 140 may identify a ratio and/or a dominant color of each image, based on processing of the received (selected) image information.

The controller 140 may identify a type of the layout based on the number of the received (selected) image information and/or the ratio.

Specifically, the controller 140 may identify one of A type and/or B type according to the number of selected images, and identify first to third types of layouts included in the A type and/or fourth to seventh types of layouts included in the B type based on the identified ratio of the image.

When one image is selected, the controller 140 may identify the A type layout, and identify first to third types of layouts based on the ratio of the image.

Figure 4:
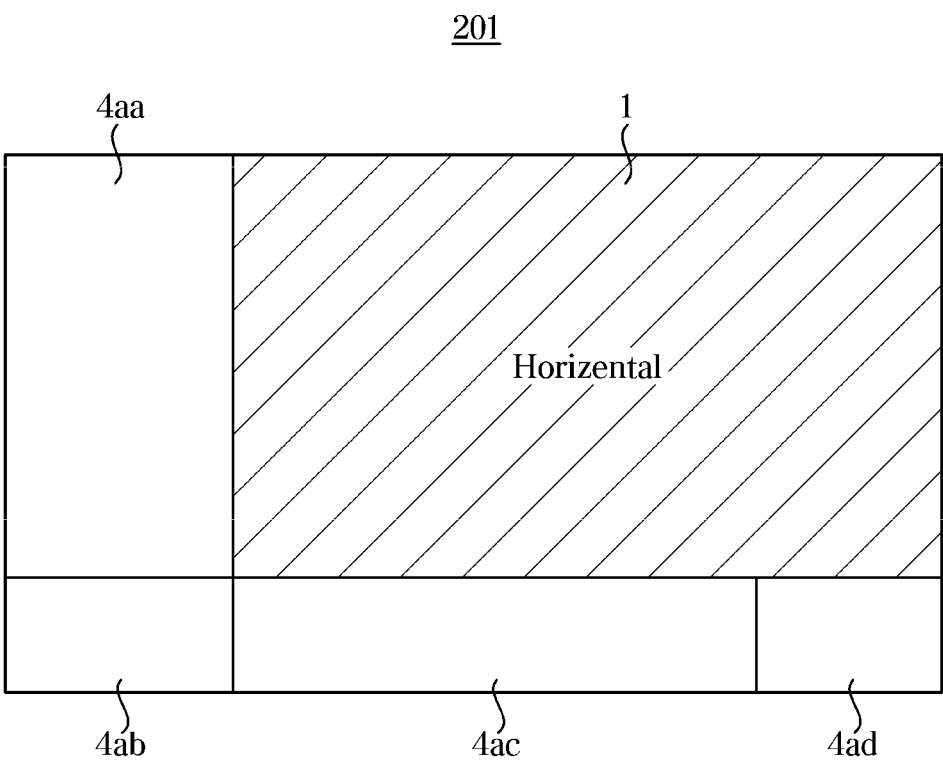
FIGS. 4 to 6 are conceptual diagrams for describing types of layouts, according to an embodiment of the disclosure.
Figure 5:
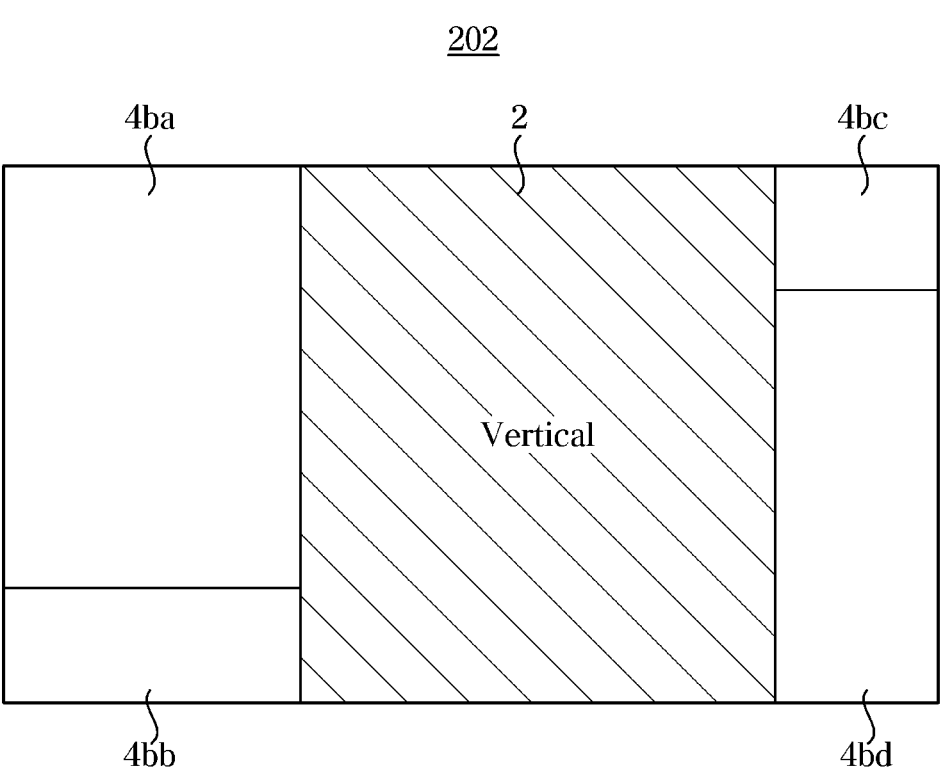
Figure 6:
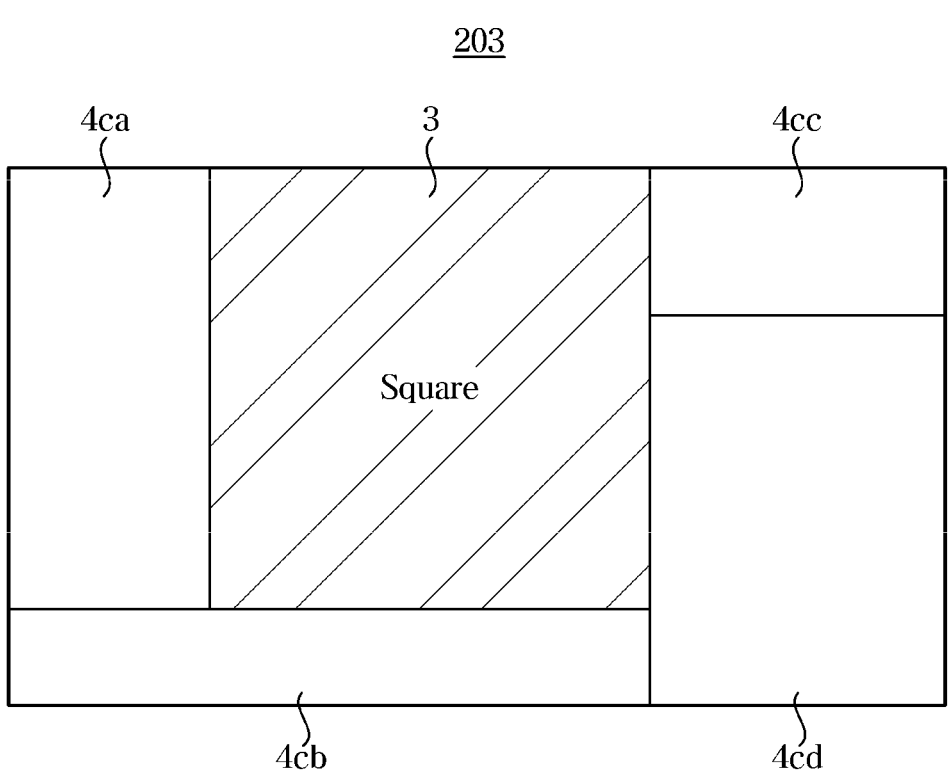

FIGS. 4 to 6 are conceptual diagrams for describing types of layouts, according to an embodiment of the disclosure.

Referring to FIGS. 4 to 6, when one image is selected, the controller 140 may identify an A type layout 201, 202 or 203, and based on a ratio of the image, identify first to third layouts 201, 202 or 203.

Specifically, the controller 140 may identify the type of the first layout 201 when the selected image is a horizontal image, identify the type of the second layout 202 when the selected image is a vertical image, or identify the type of the third layout 203 when the selected image is a square image.

As shown in FIG. 4, the first layout 201 may include, for example, one horizontal image region 1, and first to fourth information regions 4*aa*, 4*ab*, 4*ac* and 4*ad*. Specifically, the first layout 201 may include the image region 1 and/or the information regions 4*aa*, 4*ab*, 4*ac* and 4*ad*. The information regions may correspond to areas that may display, for example, a time, a weather condition, and information received from external electronic devices, and the image region 1 may correspond to an area where the horizontal image may be arranged.

The information regions 4*aa*, 4*ab*, 4*ac* and 4*ad* may be areas for which a color may be identified by the controller 140. In other words, the controller 140 may identify a color based on the dominant color of the horizontal image arranged in the horizontal image region 1. However, it is not limited thereto.

As shown in FIG. 5, the second layout 202 may include, for example, one vertical image region 2, and first to fourth information regions 4*ba*, 4*bb*, 4*bc* and 4*bd*. Specifically, the second layout 202 may include the image region 2 and/or the information regions 4*ba*, 4*bb*, 4*bc* and 4*bd*. The image region 2 may correspond to an area where the vertical image may be arranged.

As shown in FIG. 6, a third layout 203 may include, for example, one square image region 3, and first to fourth information regions 4*ca*, 4*cb*, 4*cc* and 4*cd*. Specifically, the third layout 203 may include the image region 3 and/or the information regions 4ca, 4cb, 4cc and 4cd. The image region 3 may correspond to an area where the square image may be arranged.

FIGS. 7 to 10 are conceptual diagrams for describing types of layouts, according to an embodiment of the disclosure.

Referring to FIGS. 7 to 10, when two images are selected, the controller 140 may identify a B type layout 204, 205, 206 or 207, and based on ratios of the multiple images, identify fourth to seventh layouts 204, 205, 206 or 207.

Specifically, the controller 140 may identify a ratio of each image based on processing of the selected (received) two pieces of image information, and based on the ratio, identify a type of the layout. For example, the controller 140 may identify the fourth layout 204 when the received two images are a horizontal image and a vertical image, identify the fifth layout 205 when the two images are a horizontal image and a square image or a horizontal image and another horizontal image, and identify the sixth layout 206 when the two images are a vertical image and a square image or a vertical image and another vertical image, and identify the seventh layout 207 when the two images are a square image and another square image. However, it is not limited thereto.

Furthermore, the controller 140 may arrange the images in the identified type of layout based on order of the selected images. However, it is not limited thereto. In another embodiment, based on processing of the information about the selected (received) two images, the controller 140 may identify one image having a larger value based on one of the size and/or the resolution of the images, and arrange an image having a higher resolution or a larger size in an image region that occupies a wider area based on ratios of the identified images.

Figure 7:
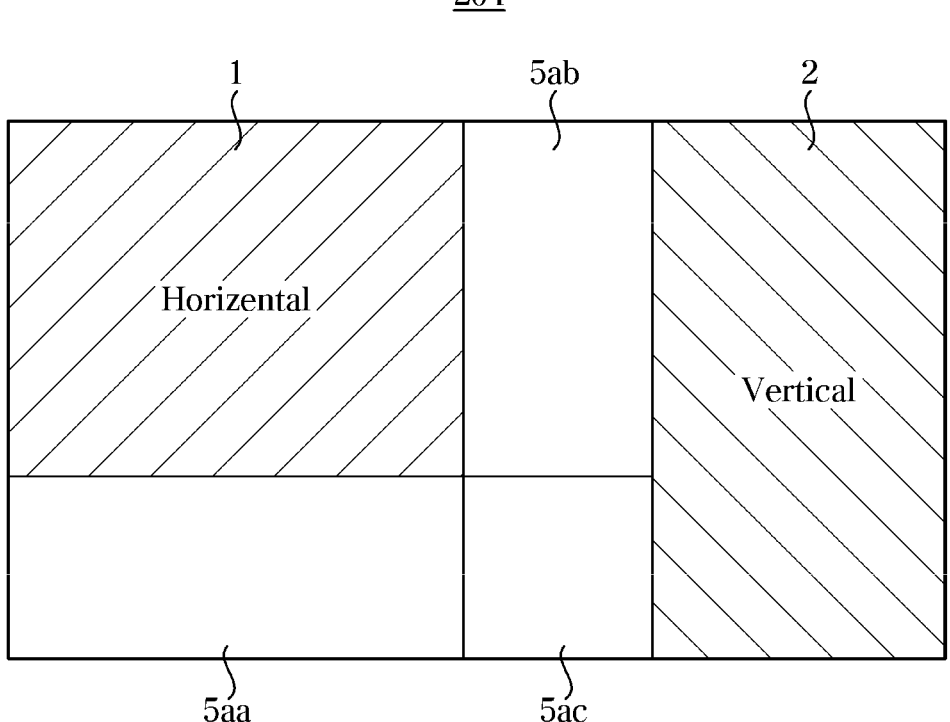
FIGS. 7 to 10 are conceptual diagrams for describing types of layouts, according to an embodiment of the disclosure.

Specifically, as shown in FIG. 7, in the case of the fourth layout 204 for arrangement of the horizontal image and/or the vertical image, arrangement criteria may be clear regardless of the order.

Figure 8:
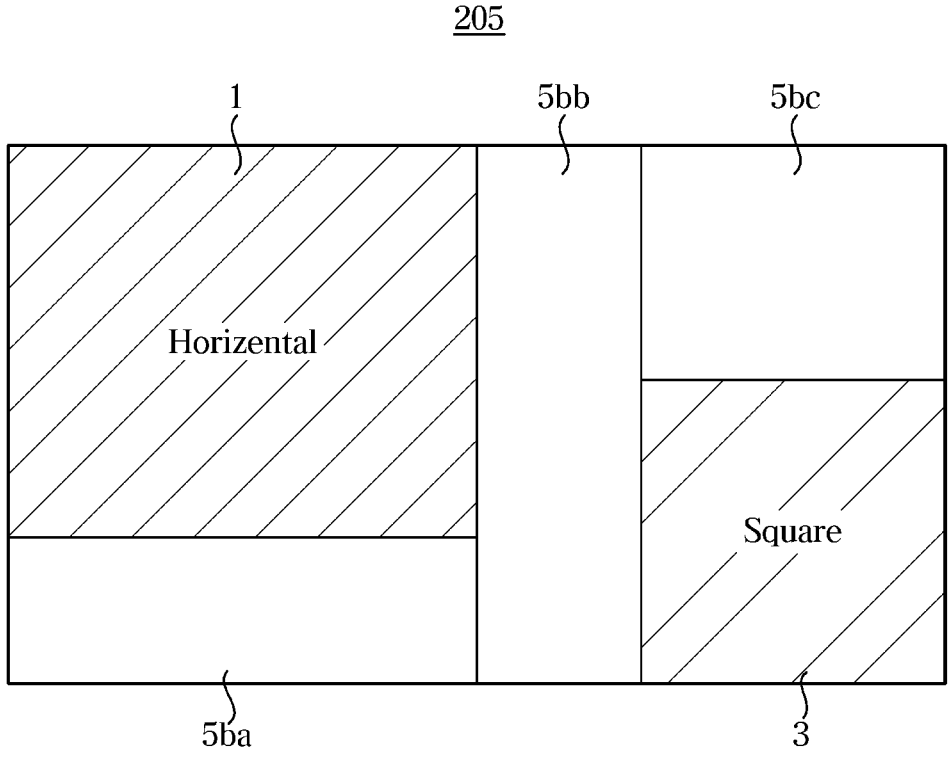

On the other hand, as the square region 3 allows any of the horizontal image and/or the vertical image to be arranged therein by image correction (cutting) of the controller 140 as described above, when the type of the fifth layout 205 is identified from selection of a horizontal image and another horizontal image as shown in FIG. 8, it is likely to have quality degradation depending on the resolutions when the images are arranged in the selected (received) order.

Hence, the images may be arranged based on at least one of resolutions and/or sizes of the images so as to provide better visibility for the user. For example, referring to FIG. 9, when a vertical image and another vertical image are received (selected), the controller 140 may identify the sixth layout 206, and place one of the two vertical images that has a larger size and/or a higher resolution in the vertical image area 2 and the other vertical image in the square image area 3 by cutting. However, it is not limited thereto.

When three pieces of image information are received (selected), the controller 140 may identify one of the fourth to seventh layouts 204, 205, 206 and 207 and arrange images.

Specifically, referring to FIG. 7, the fourth layout may include the horizontal image region 1, the vertical image region 2 and/or information regions 5aa, 5ab and 5ac. In this case that the three pieces of image information are received, the controller 140 may switch the third information region 5ac into the square image region 3. Accordingly, when the three pieces of image information are received, the controller 140 may arrange more images even without having a new type of layout.

Similarly, referring to FIG. 8, the controller 140 may switch a third information region 5bc of the fifth layout 205 into the horizontal image region 1. Furthermore, referring to FIG. 9, the controller 140 may switch a first information region 5ca of the sixth layout 206 into the vertical image region 2. Moreover, referring to FIG. 10, the controller 140 may switch a second information region 5db of the seventh layout 207 into the square image region 3. Accordingly, the controller 140 may generate a control signal to arrange and display images based on the B type layouts 204 to 207 even when three pieces of image information are received.

Specifically, when the three pieces of image information are received, the controller 140 may identify one layout among the layout types 204 to 207 each having extended information regions based on a ratio of each image information.

More specifically, the controller 140 may identify the fourth layout 204 as a layout type when three image ratios correspond to a horizontal image, a vertical image and a square image or a horizontal image, another horizontal image and a vertical image regardless of the order.

Furthermore, the controller 140 may identify the fifth layout 205 as a layout type when three image ratios correspond to an horizontal image, another horizontal image and a square image or a horizontal image, another horizontal image and another horizontal image regardless of the order.

Moreover, the controller 140 may identify the sixth layout 206 as a layout type when three image ratios correspond to a vertical image, another vertical image and a square image, or a vertical image, another vertical image and a horizontal image, or a vertical image, another vertical image and another vertical image regardless of the order.

In addition, the controller 140 may identify the seventh layout 207 as a layout type when three image ratios correspond to a square image, another square image and another square image, or a square image, another square image and a horizontal image, or a square image, another square image and a vertical image regardless of the order.

Accordingly, the controller 140 may identify a type of layout according to image ratios regardless of the order based on processing of the received three pieces of image information. However, it is not limited thereto.

In the meantime, as the square region 3 allows any of the horizontal image and/or the vertical image to be arranged therein through image correction (cutting) of the controller 140 as described above, referring to FIG. 8, the controller 140 may identify a type of layout to be the fifth layout 205 when ratios of a horizontal image, another horizontal image and another horizontal image are identified by processing the received multiple pieces of image information. In this case, when the images are arranged in the selected (received) order, it is likely to have quality degradation depending on the resolutions.

Hence, the images may be arranged based on at least one of resolutions and/or sizes of the images so as to provide better visibility for the user. For example, referring to FIG. 8, when ratios of the selected three images correspond to a horizontal image, another horizontal image and another horizontal image, the three images may be arranged in the horizontal image region 1, the square region 3 and/or the information region 5bc in the order of bigger ones according to at least one criterion of the three pieces of image information.

Figure 9:
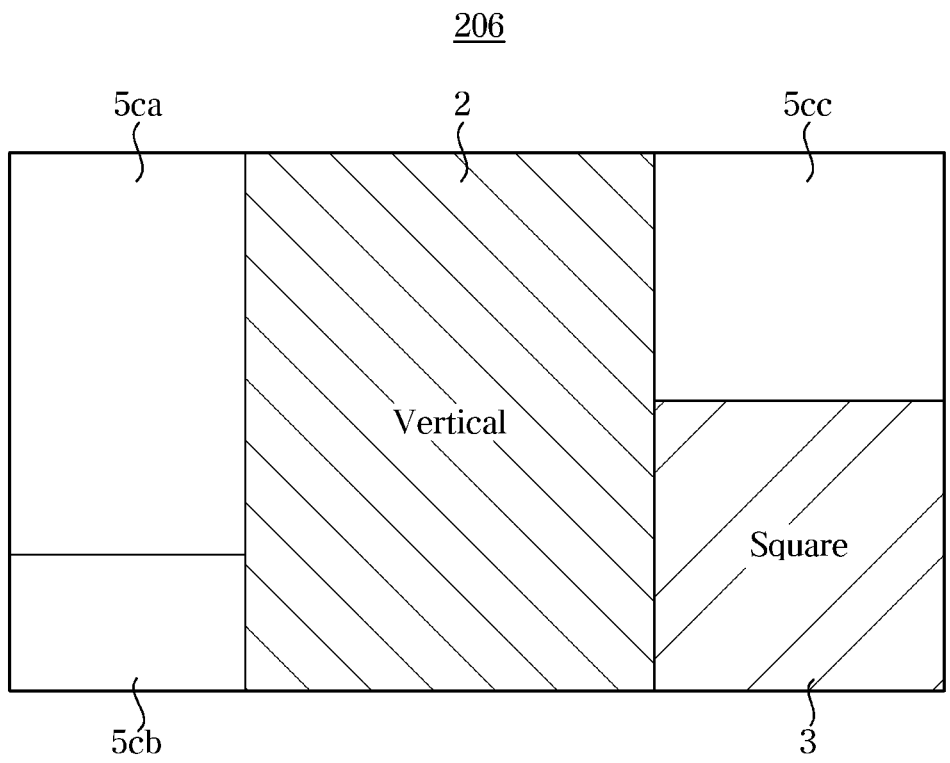
Figure 10:
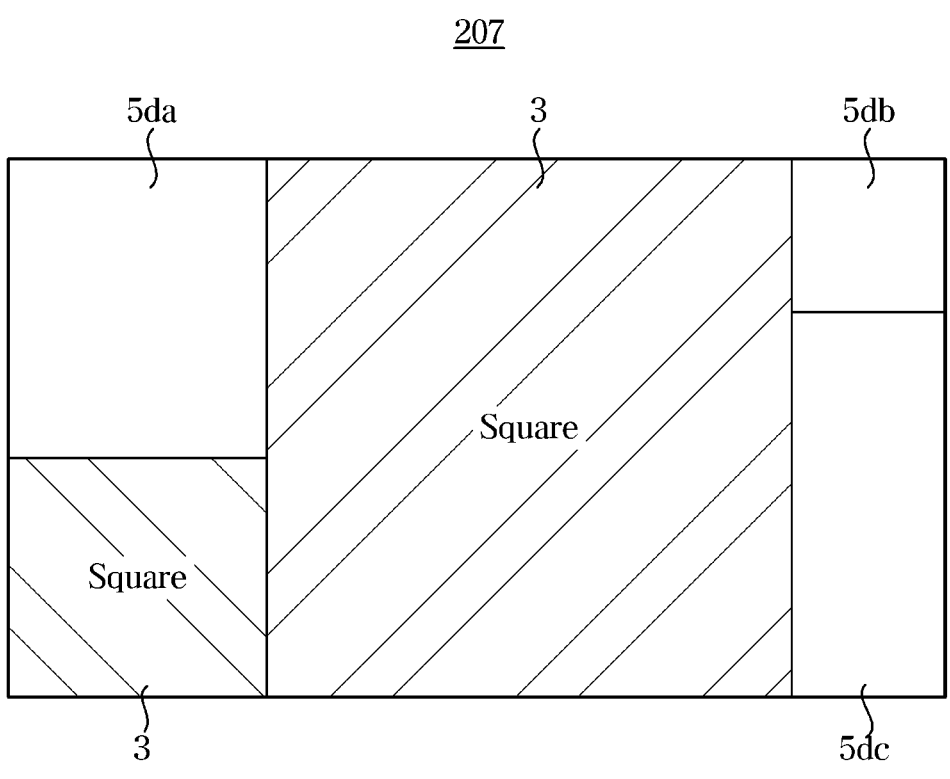

Furthermore, for example, referring to FIG. 9, when ratios of the selected images correspond to a vertical image, another vertical image and a horizontal image (i.e., images two of which having the same ratio are selected (received)), the controller 140 may arrange the two images in the horizontal image region 2 and the information region 5ca in the order of bigger ones according to at least one criterion of the images having the same ratio, and arrange the horizontal image in the square image region 3 by cutting. However, it is not limited thereto. Accordingly, the controller 140 may prevent image quality degradation that may otherwise occur when images are arranged in the layout in the selected order of the images.

Figure 11:
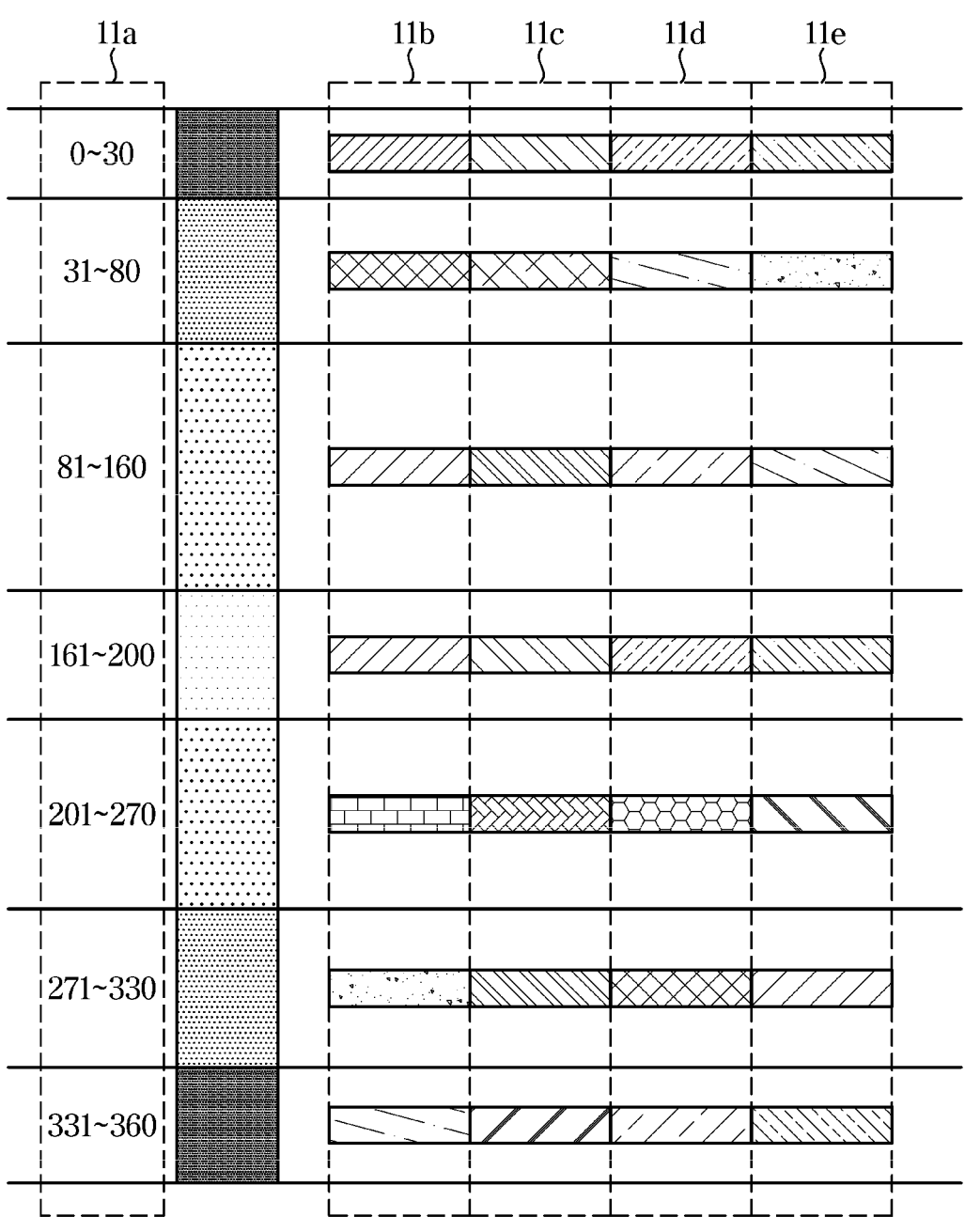
FIG. 11 is a conceptual diagram for describing a color chip list, according to an embodiment of the disclosure.
Figure 12:
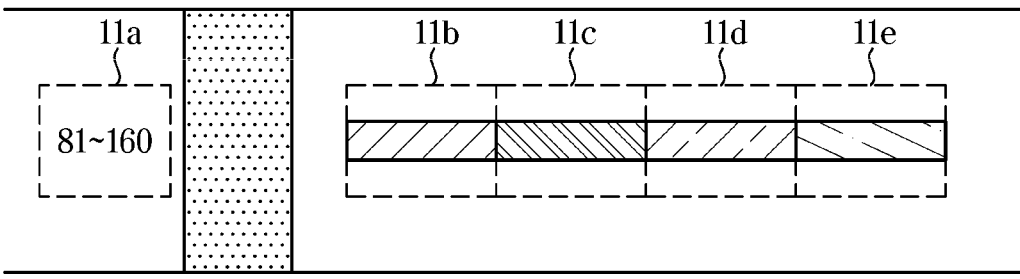
FIG. 12 illustrates a diagram for describing a layout to which a color chip list is applied, according to an embodiment of the disclosure.
Figure 12:
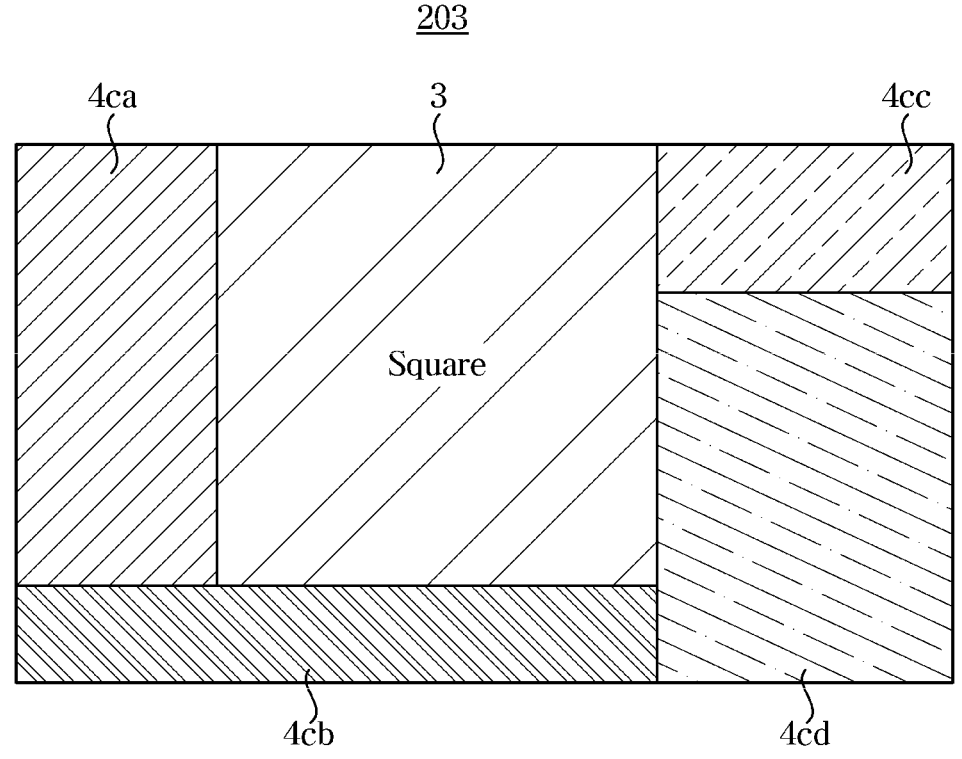

FIG. 11 is a conceptual diagram for describing a color chip list, according to an embodiment of the disclosure. FIG. 12 illustrates a diagram for explaining a layout to which a color chip list is applied, according to an embodiment of the disclosure.

Referring to FIG. 11, the controller 140 may identify a main dominant color of the images arranged as described above. The controller 140 may then identify a color value range 11a including a hue of the identified main dominant color, and identify a color for the layout based on a color chip 11b, 11c, 11d and 11e corresponding to the color value range 11a.

For example, referring to FIG. 12, when one image information is received and a ratio of the image identified based on processing of the image information corresponds to a square image, the controller 140 may identify a type of the layout as the third layout 203. In this case, the controller 140 may derive a hue of the identified main dominant color of the image based on processing of the image information, and identify the color value range 11a including the hue in the color chip list stored in the memory. Accordingly, the controller 140 may identify colors of the color chip 11b, 11c, 11d and 11e corresponding to the color value range 11a. For example, the controller 140 may identify the first color 11b corresponding to the first information region 4ca of the third layout 203, the second color 11c corresponding to the second information region 4cb, the third color 11d corresponding to the third information region 4cc and/or the fourth color 11e corresponding to the fourth information region 4cd and arrange the colors. However, it is not limited thereto.

Similarly, when receiving two pieces of image information, the controller 140 may omit a color corresponding to the fourth color 11e because information regions are reduced by one.

Figure 13:
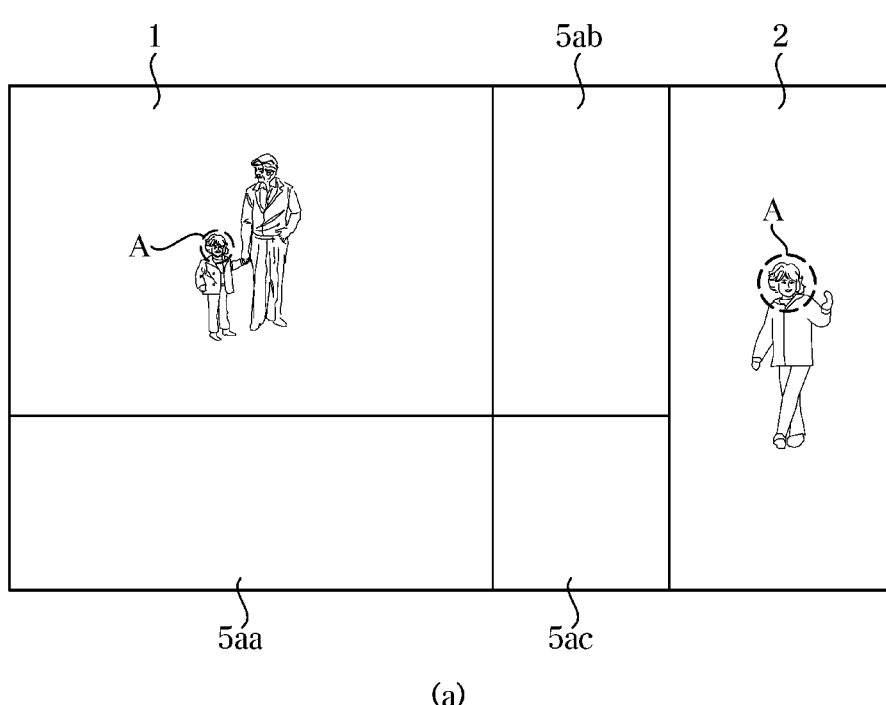
FIG. 13 is a diagram illustrating correction of an image region based on an object identified by an electronic apparatus, according to an embodiment of the disclosure.
Figure 13:
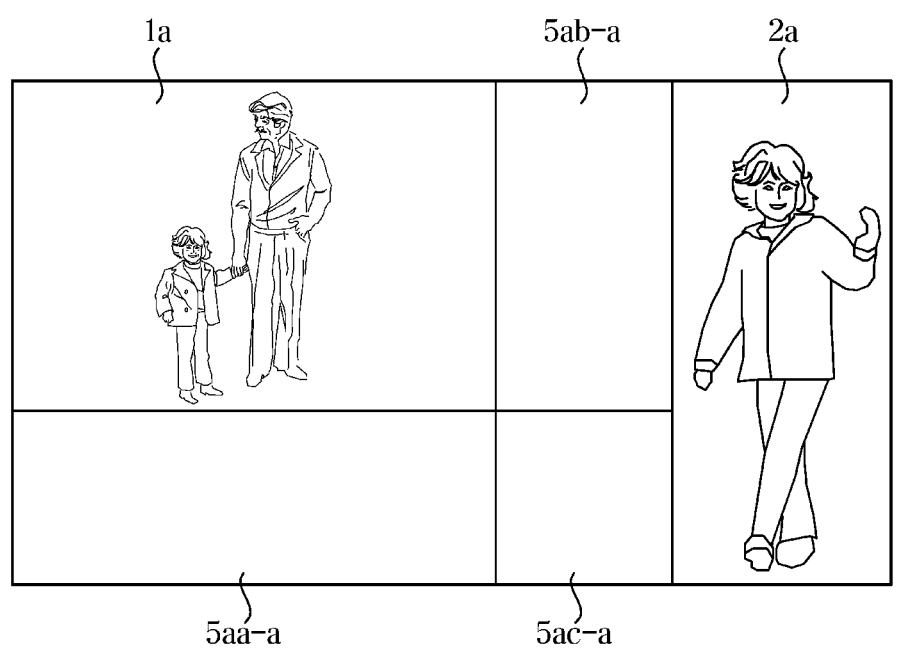

FIG. 13 is a diagram illustrating correction of an image region based on an object identified by the controller 140, according to an embodiment of the disclosure.

Referring to FIG. 13, when selecting (receiving) multiple pieces of image information, the controller 140 may identify a common object A in the multiple pieces of image information based on processing of the received image information. Accordingly, the processor 141 may correct the regions 1 and 2 of the images displayed on the display 130 based on the common object A. For example, referring to (b) of FIG. 13, the processor 141 may arrange images 1a and 2a so that the common object in the multiple pieces of image information comes in the center of the respective image regions of the layout.

Furthermore, the processor 141 may perform correction on information regions 5ab-a and 5ac-a by adjusting positions of frames of the layout to enlarge areas for the common object in the multiple pieces of image information. However, it is not limited thereto.

Figure 14:
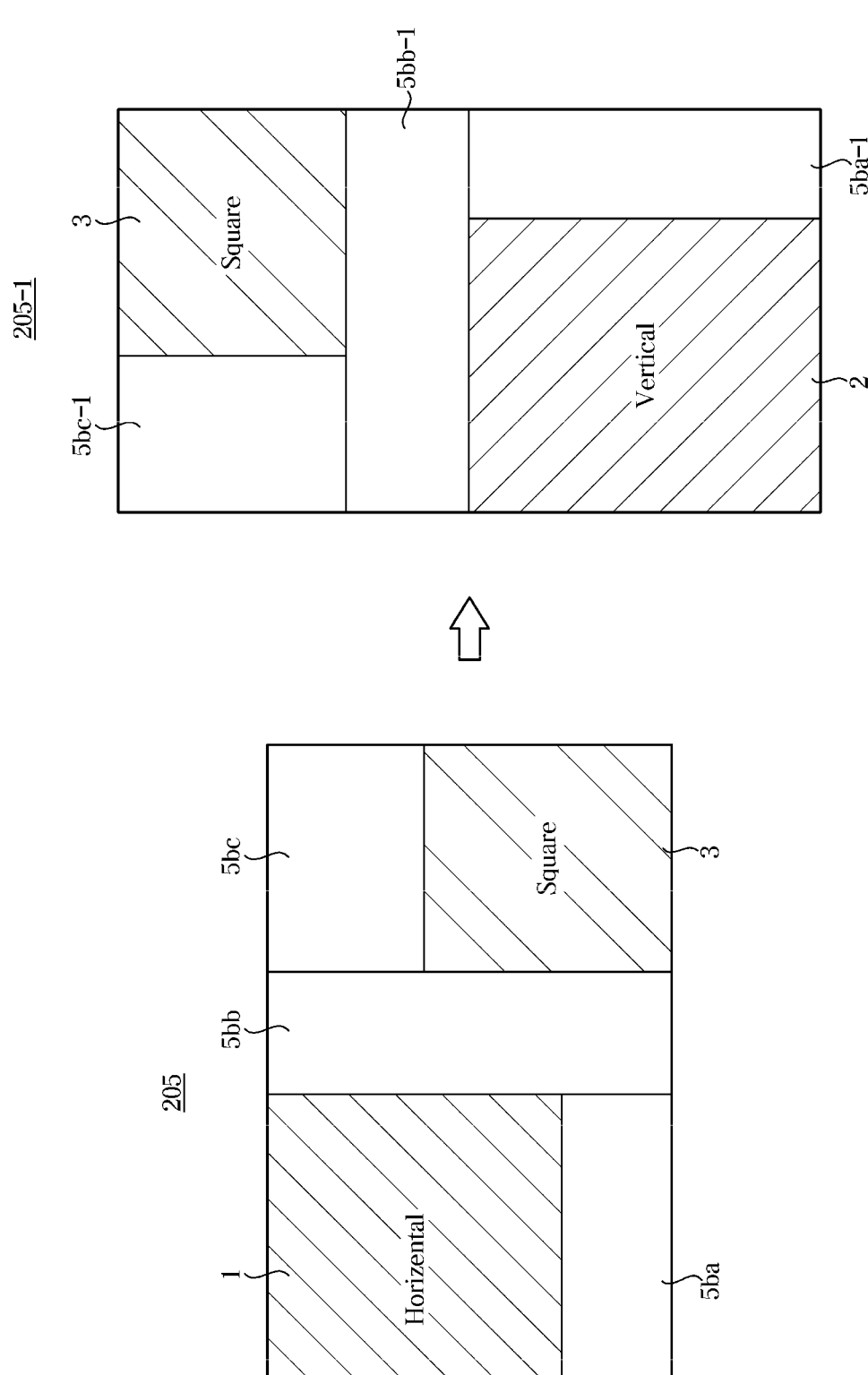
FIGS. 14 and 15 illustrate diagrams for describing horizontal/vertical conversion logic of layouts, according to an embodiment of the disclosure.
Figure 15:
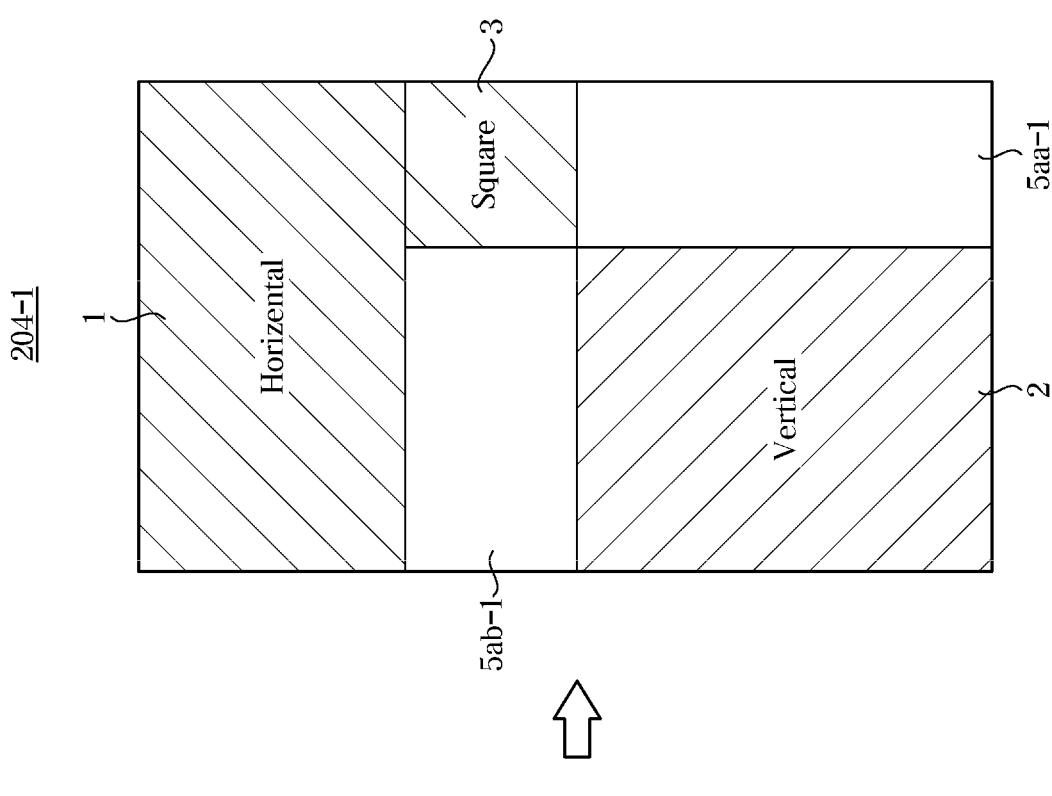
Figure 15:
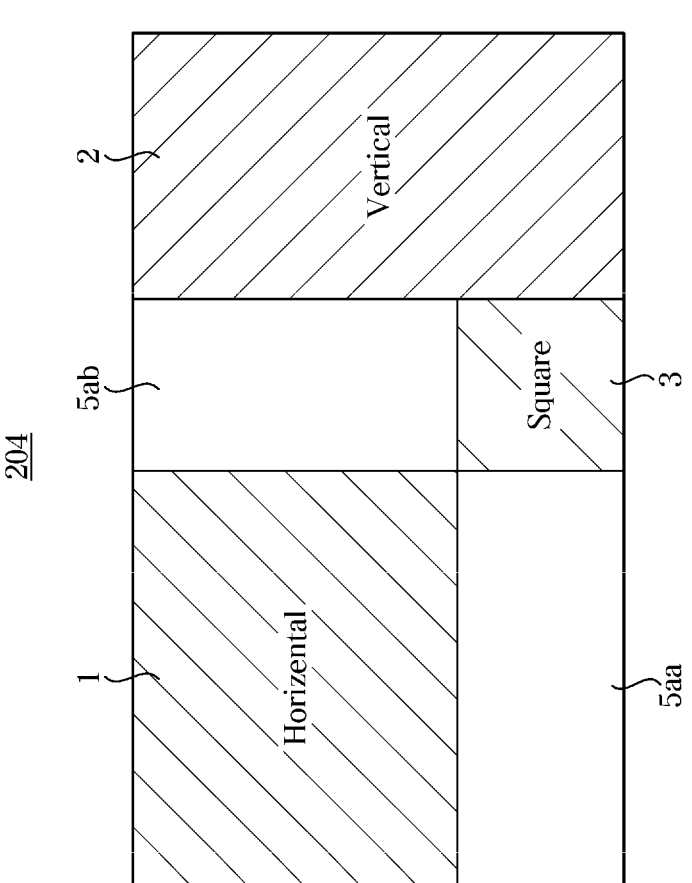

FIGS. 14 and 15 illustrate diagrams for describing horizontal/vertical conversion logic of layouts, according to an embodiment of the disclosure.

The controller 140 may identify a new type of layout based on the first to seventh layouts 201 to 207. Specifically, referring to FIG. 14, for example, the controller 140 may identify the type to be the fifth layout 205 when the identified ratios of two images correspond to a horizontal image and another horizontal image and/or a horizontal image and a square image. In this case, the controller 140 may generate a new type of layout by switching the horizontal image region 1 to the vertical image region 2 and switching the vertical image region 2 to the horizontal image region 1 for width/height conversion.

In other words, as shown in FIG. 14, a vertical type fifth layout 205-1 generated based on the fifth layout 205 may include the square image region 3 and/or the vertical image region 2 and information regions 5ba-1 to 5bc-3.

Referring to FIG. 15, for example, the controller 140 may identify the fourth layout 204 as a layout type when the identified three image ratios correspond to a horizontal image, a vertical image and a square image or a horizontal image, another horizontal image and a vertical image. In this case, the controller 140 may generate a vertical layout by switching the horizontal image region 1 to the vertical image region 2 and switching the vertical image region 2 to the horizontal image region 1 for width/height conversion.

In other words, as shown in FIG. 15, a vertical type fourth layout 204-1 generated based on the fourth layout 204 may include the horizontal image region 1, the vertical image region 3, the square image region 3 and/or information regions 5aa-1 to 5ab-1.

Accordingly, the vertical layout may be equally applied in type identification of the horizontal layouts 201 to 207 by vertical and horizontal conversion based on the method of identifying the horizontal layout 201 to 207. Hence, even without an additional type of layout, a layout applied to all the ratios of various images including horizontal/vertical images may be displayed.

In the meantime, when at least four pieces of image information are received, the controller 140 may group the images by putting three of the images in each image group and control the display 130 to rotate and display the image group at predetermined intervals. However, it is not limited thereto.

Figure 16:
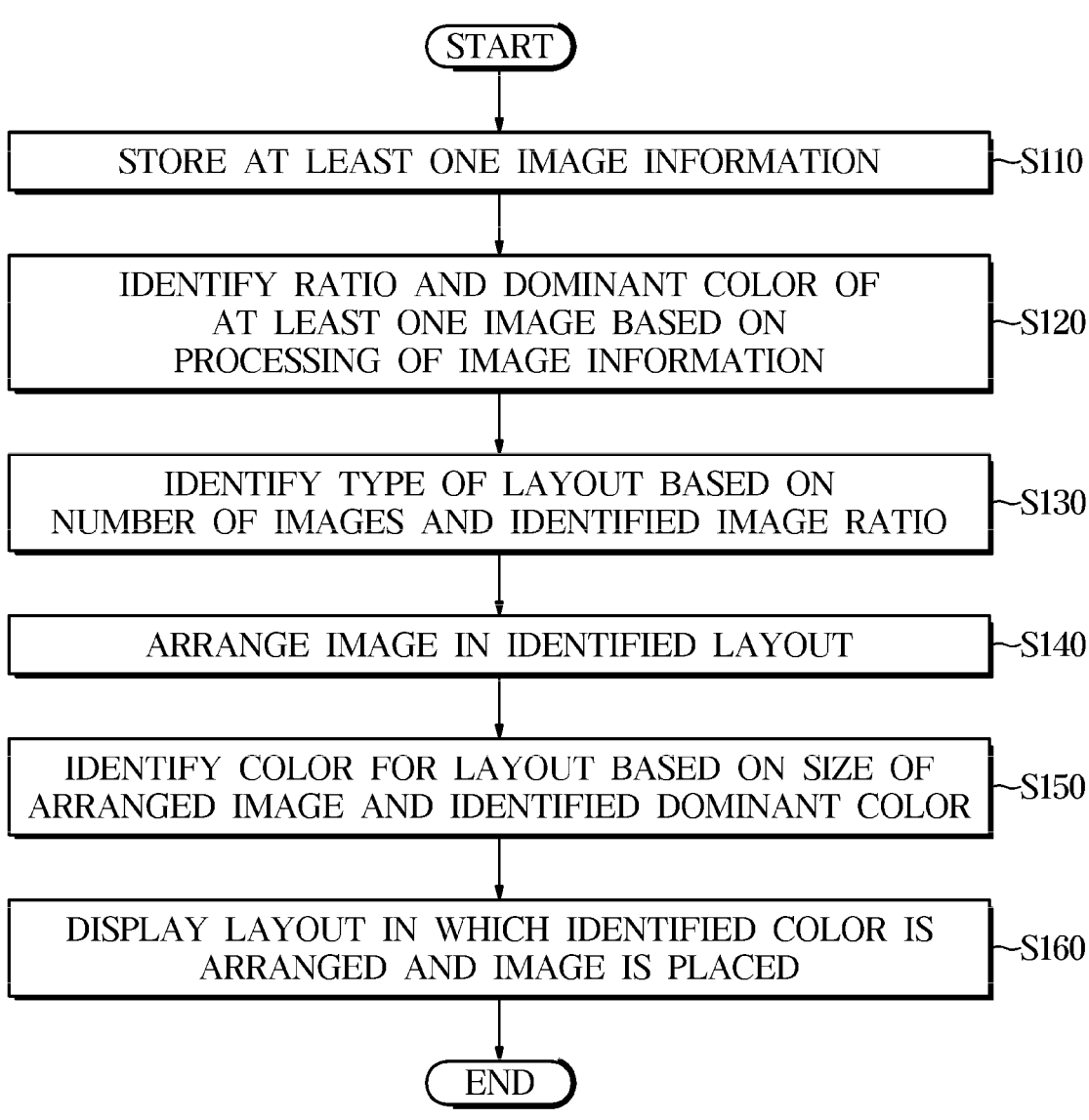
FIG. 16 is a flowchart for describing a method of controlling an electronic apparatus, according to an embodiment of the disclosure.

FIG. 16 is a flowchart for describing a method of controlling an electronic apparatus, according to an embodiment of the disclosure.

The method of controlling an electronic apparatus shown in FIG. 16 may be performed by the electronic apparatus 100. What are described above about the electronic apparatus 100 will not be repeated, but may be equally applied to the method of controlling an electronic apparatus.

Referring to FIG. 16, the electronic apparatus 100 may store at least one image information, in S110.

The electronic apparatus 100 may identify a ratio of an image and/or a dominant color of the image based on processing of the image information, in S120.

The electronic apparatus 100 may identify a type of a layout based on the number of received (selected) images and/or the identified ratios of the images, in S130.

The electronic apparatus 100 may arrange the images in the identified type of the layout, in S140.

The electronic apparatus 100 may identify a color for the layout based on a ratio of the arranged image and/or the identified dominant color, in S150.

The electronic apparatus 100 may display the layout in which the identified color is arranged and the image is placed, in S160.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random-access memory (RAM), a magnetic tape, a magnetic disk, a flash memory, an optical data storage device, etc.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. An electronic apparatus comprising:
a memory configured to store a plurality of images;
a display; and
a processor
configured to:
    based on image information of at least one image among the plurality of images, identify a ratio of a height of the at least one image to a width of the at least one image and a dominant color of the at least one image,
    based on a number of the at least one image and the identified ratio, identify a type of a layout in which the at least one image is displayable,
    arrange the at least one image in the identified type of the layout,
    identify a color for the layout based on a size of the at least one image and the identified dominant color, and
    display, on the display, the at least one image in the layout in which the identified color is arranged.

2. The electronic apparatus of claim 1, wherein the processor is further configured to:
    give a weight to the at least one image according to the size of the at least one image,
    based on the weight given to the at least one image and the identified dominant color, identify a main dominant color, and
    based on the identified main dominant color, further identify a color for the layout.

3. The electronic apparatus of claim 1, wherein the memory is further configured to store a color chip list corresponding to a color value of the identified dominant color, and
the processor is further configured to:
    based on the identified dominant color and the stored color chip list, identify the color for the layout.

4. The electronic apparatus of claim 1, further comprising:
a speaker,
wherein the processor is further configured to:

based on the image information, identify a time, a place, a weather condition, or a combination thereof in which the at least one image is captured,
    based on the identified time, the identified place, the identified weather condition, or the combination thereof, identify a sound, and
    control the speaker to output the identified sound.

5. The electronic apparatus of claim 1, wherein the processor is further configured to:
    identify a common object that is in at least two images among the plurality of images based on image information of the at least two images, and
    based on the identified common object, correct a region of the displayed at least one image.

6. The electronic apparatus of claim 1, further comprising:
a communicator configured to receive configuration information including a filter type,
wherein the processor is further configured to:
    based on the received configuration information, display, on the display, the at least one image with a filter applied to the at least one image.

7. The electronic apparatus of claim 1, wherein the layout includes an image region and an information region, and
the processor is further configured to:
    display, on the display, a weather condition, a date, a time, or a combination thereof in the information region.

8. The electronic apparatus of claim 1, wherein the processor is further configured to:
    based on the image information, identify a type of the at least one image, and
    based on the identified type, display, on the display, the at least one image with a filter applied to the at least one image.

9. The electronic apparatus of claim 1, wherein the processor is further configured to:
    based on the image information, identify a type of the at least one image, and
    based on the identified type, group the at least one image with at least one another image of the plurality of images that is identified as being of a corresponding type into a group of images, and
    based on the group of images,
        identify a type of the layout for the group of images,
        arrange the at least one image and the at least one another image that are grouped in the identified type of the layout for the group of images,
        based on the size of the at least one image, a size of the at least one another image, and a dominant color of the at least one image and the at least one another image that are grouped, identify the color for the layout of the group of images, and
        display, on the display, the group of images in the layout for the group of images in which the identified color for the layout of the group of images is arranged.

10. The electronic apparatus of claim 9, wherein the processor is further configured to:
    switch between a first group of images that are grouped and a second group of images that are grouped at predetermined intervals.

11. The electronic apparatus of claim 1, wherein the processor is further configured to:
    based on the image information, identify a type of the at least one image, based on the identified type, identify an image selection pattern, based on the identified image selection pattern, group the at least one image with at least one another image of the plurality of images that is identified as being of a corresponding type into a group of images, and based on the group of images, identify a type of the layout for the group of images, arrange the at least one image and the at least one another image that are grouped in the identified type of the layout for the group of images, based on the size of the at least one image, a size of the at least one another image, and a dominant color of the at least one image and the at least one another image that are grouped, identify a color for the layout of the group of images, and display, on the display, the group of images in the layout for the group of images in which the identified color for the layout of the group of images is arranged.

12. The electronic apparatus of claim 1, wherein the processor is further configured to:

based on the identified ratio, identify a shape of the at least one image, and based on the number of the at least one image and the identified shape of the at least one image, identify the type of the layout in which the at least one image is displayable.

13. The electronic apparatus of claim 1, wherein the processor is further configured to:

calculate the identified ratio as the height divided by the width, based on the calculated ratio being approximately 1, identify the at least one image as a square image, and identify the type of the layout as a layout having a square image region, based on the calculated ratio being greater than approximately 1, identify the at least one image as a vertically elongated image, and identify the type of the layout as a layout having a vertically elongated image region, and based on the calculated ratio being less than approximately 1, identify the at least one image as a horizontally elongated image, and identify the type of the layout as a layout having a horizontally elongated image region.

14. The electronic apparatus of claim 1, wherein the processor is further configured to:

identify a size and/or resolution of at least two images among the plurality of images based on image information of the at least two images, and based on the identified size and/or resolution, arrange an image among the at least two images that has a larger size and/or higher resolution in an image region of a plurality of image regions of the identified type of layout that has a wider area.

15. A method of controlling an electronic apparatus comprising a memory, a processor and a display, the method comprising:

storing image information of at least one image among a plurality of images in the memory, by the processor, based on the stored image information, identifying a ratio of a height of the at least one image to a width of the at least one image and a dominant color of the at least one image, based on a number of the at least one image and the identified ratio, identifying a type of a layout in which the at least one image is displayable, arranging the at least one image in the identified type of the layout, identifying a color for the layout based on a size of the at least one image and the identified dominant color, and displaying, on the display, the at least one image in the layout in which the identified color is arranged.

16. The method of claim 15, wherein the identifying the ratio and the dominant color of the image includes:

giving a weight to the at least one image according to the size of the at least one image, based on the weight given to the at least one image and the identified dominant color, identifying a main dominant color, and the identifying the color further includes:

based on the identified main dominant color, identifying the color for the layout.

17. The method of claim 15, wherein the storing includes storing a color chip list corresponding to a color value of the identified dominant color, and the identifying the color further includes:

based on the identified dominant color and the stored color chip list, identifying a the color for the layout.

18. The method of claim 15, wherein the electronic apparatus further includes:

a speaker, and the identifying the ratio and the dominant color includes:

based on the image information, identifying a time, a place a weather condition, or a combination thereof in which the at least one image is captured, and the displaying includes:

based on the identified time, the identified place, the identified weather condition, or the combination thereof, identifying a sound, and controlling the speaker to output outputting the identified sound.

* * * * *